US008018351B2

(12) United States Patent
Hering et al.

(10) Patent No.: US 8,018,351 B2
(45) Date of Patent: Sep. 13, 2011

(54) METHOD FOR PROVIDING ASSISTANCE DURING A PARKING MANEUVER OF A VEHICLE

(75) Inventors: Michael Hering, Leonberg (DE); Benno Albrecht, Holzenaden (DE)

(73) Assignee: Robert Bosch GmbH, Stuttgart (DE)

( * ) Notice: Subject to any disclaimer, the term of this patent is extended or adjusted under 35 U.S.C. 154(b) by 359 days.

(21) Appl. No.: 12/227,625

(22) PCT Filed: Jun. 8, 2007

(86) PCT No.: PCT/EP2007/055655
§ 371 (c)(1),
(2), (4) Date: Nov. 21, 2008

(87) PCT Pub. No.: WO2008/003562
PCT Pub. Date: Jan. 10, 2008

(65) Prior Publication Data
US 2009/0243887 A1    Oct. 1, 2009

(30) Foreign Application Priority Data
Jul. 3, 2006   (DE) .......................... 10 2006 030 560

(51) Int. Cl.
*B60Q 1/48* (2006.01)
(52) U.S. Cl. ................................................... 340/932.2
(58) Field of Classification Search ............... 340/932.2, 340/435, 943, 933, 444, 436; 180/199
See application file for complete search history.

(56) References Cited

U.S. PATENT DOCUMENTS

| 4,931,930 A | * | 6/1990 | Shyu et al. | ...................... 701/36 |
| 7,786,896 B2 | * | 8/2010 | Schmid et al. | ............. 340/932.2 |
| 2005/0035879 A1 | * | 2/2005 | Gotzig et al. | ............. 340/932.2 |
| 2006/0139181 A1 | * | 6/2006 | Danz et al. | ................. 340/932.2 |

FOREIGN PATENT DOCUMENTS

| DE | 102 20 426 | 11/2003 |
| DE | 102 51 558 | 11/2003 |
| DE | 10 2005 015 396 | 12/2005 |
| EP | 1 170 171 | 1/2002 |
| EP | 1 199 225 | 4/2002 |
| EP | 1 747 973 | 1/2007 |
| FR | 2 704 665 | 11/1994 |
| FR | 2 872 122 | 12/2005 |
| WO | 03/087874 | 10/2003 |
| WO | 2005/085044 | 9/2005 |
| WO | 2005/120932 | 12/2005 |
| WO | 2006/034923 | 4/2006 |

* cited by examiner

*Primary Examiner* — Phung Nguyen
(74) *Attorney, Agent, or Firm* — Kenyon & Kenyon LLP

(57) ABSTRACT

A method providing assistance during the parking maneuver of a vehicle into a parking space situated laterally to the vehicle to be parked, an erroneous length of the parking space being detected with the aid of a sensor system of the vehicle while the vehicle drives past the parking space on a curved trajectory. To determine the actual length of the parking space, a trajectory of the vehicle differing from a straight trajectory of the vehicle is additionally detected while driving past the parking space, for example, on the basis of the steering angle of the vehicle, and a correction value for the detected length of the parking space is ascertained therefrom. The actual length of the parking space is determined with a high degree of accuracy without the need for other measured values to be detected, for example, the orientation of parked vehicles or the depth of the parking space.

10 Claims, 1 Drawing Sheet

METHOD FOR PROVIDING ASSISTANCE DURING A PARKING MANEUVER OF A VEHICLE

FIELD OF THE INVENTION

The present invention relates to a method for providing assistance during a parking maneuver of a vehicle into a parking space situated laterally to the vehicle to be parked, a length of the parking space being detected with the aid of a sensor system of the vehicle while the vehicle passes by the parking space.

BACKGROUND INFORMATION

A method of this type is known in general as a function of a parking space locating (PSL) system as an assistant to a driver of the vehicle for finding a parking space. In particular the method is known as a function of a parking space measuring system, which supports the driver of a vehicle in searching for a sufficiently large parking space for the vehicle, parking space locating representing a generalization of the parking space measuring system. The parking space measuring system may cooperate with a parking system for semi-autonomous parking in which the driver must operate the accelerator and brake pedals of the vehicle, while steering may also be performed automatically. The system calculates a trajectory for parking the vehicle into the parking space and informs the driver, for example, with the aid of acoustic signals about the actions he has to perform to park the vehicle in the parking space. One basic principle is that the vehicle may not touch, move onto or over a parking space boundary, for example, a curb or already parked vehicles. The more accurately the length of the parking space is detected, the more reliably may a parking maneuver take place.

In addition, a method for ascertaining geometric data for parking maneuvers is known from DE 102 51 558 A1. The lateral distance between the vehicle and a curb is to be measured multiple times successively with the aid of an on-board distance sensor while a vehicle drives past a parking space laterally. Furthermore, the length of the parking space is to be detected via a distance covered while passing by the parking space. Non-parallel passing by the parking space should be compensated for by taking into account a mathematical vehicle model and by detecting an angle between the longitudinal direction of the vehicle and the curb.

German patent document DE 10 2005 015 396 A1 discusses a method in which the position of the lateral parking space boundary facing away from the vehicle to be parked and/or the orientation of the lateral parking space boundary with respect to the vehicle to be parked is calculated from the data detected by the sensor system before reaching and/or after passing the parking space for providing a reliable reference for a lateral parking space boundary. According to a special refinement, the yaw angle between the orientation to be reached by the vehicle in the parking space and an instantaneous orientation of the longitudinal axis of the vehicle to be parked is ascertained, for example, also continuously.

Furthermore, DE 102 20 426 A1 discusses a method for operating a parking assistance system for a vehicle. The vehicle is braked and/or accelerated while moving into and/or out of a parking space by generally taking into account a determination of a length and/or a width of a parking space while the vehicle passes by the parking space. A parking maneuver into the parking space is subsequently determined for the vehicle.

During the following parking maneuver, a future steering angle change is determined on the basis of an instantaneous turn of the steering wheel and communicated to the driver.

In practice, reliably determining the length of a parking space is often found to be relatively difficult if the vehicle passes by the parking space to be determined on a curved trajectory because the distance traveled by the vehicle no longer corresponds to the shortest connecting line between the obstacles delimiting the parking space, i.e., the actual length of the parking space. Rather, the distance traveled may be greater or smaller than the length of the parking space to be determined. This problem is of practical relevance in particular because normally the parking maneuver is initiated by the driver by consciously steering inward.

Measuring the steering angle of the vehicle while driving past the parking space and determining the orientation of the objects delimiting the parking space with respect to the vehicle, comparing the steering angle with the orientation of the delimiting objects, and calculating the length and/or depth of the parking space as a function of the comparison of the steering angle with the orientation of the delimiting objects has also been considered. Such a procedure, however, requires a relatively high computing complexity due to the necessary analysis of signals of different sensors.

SUMMARY OF THE INVENTION

An object of the exemplary embodiments and/or exemplary methods of the present invention is to provide a method of the above-mentioned type for assisting in the parking of a vehicle which makes simple detection of the length of the parking space with high precision possible.

This object is achieved according to the exemplary embodiments and/or exemplary methods of the present invention by using a method of the above-mentioned type in that a trajectory differing from a straight trajectory of the vehicle is detected while driving past the parking space and a correction value for the detected length of the parking space is ascertained therefrom.

According to the method of the present invention, the parking space is thus initially detected as usual when the vehicle to be parked is driven by. The systematic error resulting from a curved trajectory due to the difference between the length of the parking space and the distance traveled by the vehicle is compensated for according to the present invention by using a correction value which is obtained only from the detected curved trajectory of the vehicle to be parked. In other words, both the detection, in particular sensor-supported detection, of the orientation of the objects delimiting the parking space and the detection of the depth of the parking space are dispensable, so that the exemplary embodiments and/or exemplary methods of the present invention may be implemented in a technically simple manner. In addition, due to rapid computing of the correction value, improved accuracy in calculating the actual length of the parking space is achieved. Sensors oriented laterally with respect to the vehicle may be provided for detecting and measuring the parking space.

Using the method according to the present invention, which concerns backward parking in particular and is suitable mostly for motor vehicles, including both passenger cars and utility vehicles, possible errors regarding the measurement of the parking space resulting from the curved trajectory of the vehicle passing by the parking space are eliminated or at least reduced. Due to the improved predicting accuracy thus made possible, on the one hand, superfluous parking attempts into parking spaces that are actually too small, but erroneously measured too large, may be avoided; on the other hand, comparatively small parking spaces may also be used which without the present invention would be measured too large due to error sources that have not been eliminated. For example, the exemplary embodiments and/or exemplary methods of the present invention may be used in a semi-autonomous or autonomous parking system and may improve the function and reliability of the parking system. The delimiting objects may be any objects delimiting the parking space such as, for example, an already parked vehicle, a curb, or a tree.

The trajectory of the vehicle may be detected using a satellite receiver (GPS). It is of particular advantage, however, if the trajectory is determined on the basis of a rotation of the vehicle about its vertical axis, detected by a sensor. The trajectory is thus detectable in particular independently of external reference points, so that in particular error factors in detecting the measured value are largely avoided. Both additional sensors and sensors already present in the vehicle may be used, even redundantly, for example.

It has also been found very practical if the trajectory of the vehicle is determined on the basis of a detected steering wheel angle and/or steering angle so as to draw a conclusion, in a simple manner, about a curved trajectory from the difference of the steering angle and a mean position. In addition, sensors of this type, whose signals may be used with little complexity, are already present in many modern vehicles.

Another particularly promising refinement of the exemplary embodiments and/or exemplary methods of the present invention is achieved by determining the trajectory of the vehicle on the basis of the detected difference between the distances traveled by the wheels of the two tracks of the vehicle. The radius of the trajectory is thus detected with the aid of a wheel pulse counter on the basis of the difference between the traveled distance of the internal curve and the external curve of the trajectory.

A specific embodiment of the method according to the present invention in which the trajectory of the vehicle is determined by using a yaw rate sensor is practical in particular. The yaw rate sensor detects a yaw rate as the rate of rotation about the vertical axis and thus may be operated independently of other sensors for detecting the state of the vehicle.

In a further embodiment of the method, the trajectory of the vehicle is determined in a similarly advantageous manner with the aid of a transverse acceleration sensor, which also makes simple but very reliable measured value detection possible. The correction value may thus be determined very accurately.

The correction value may be provided as an additional warning function as a visual or acoustic warning signal for the vehicle's driver. In contrast, an embodiment of the method is particularly reliable in which an actual parking space length is determined from the detected length of the parking space by using a correction value, and only this actual parking space length is displayed to the driver. In addition, the method allows the actual parking space length to be used in autonomous or semi-autonomous parking assistance systems.

As long as the vehicle follows a constant curved trajectory, the detected radius of the curved trajectory of the entire distance covered by the vehicle when driving past the parking space may be used as a correction value. However, since as normally occurs in practice, the radius of the curve continuously varies, a modification in which the correction value is detected continuously or in short time intervals to detect the length of the parking space with high accuracy even when the sign of the steering angle changes while driving past, i.e., the driver steers the vehicle from a left-hand curve into a right-hand curve, is particularly useful.

One exemplary embodiment of the present invention is depicted in the drawings and is described in greater detail below.

DETAILED DESCRIPTION

Figure 1:
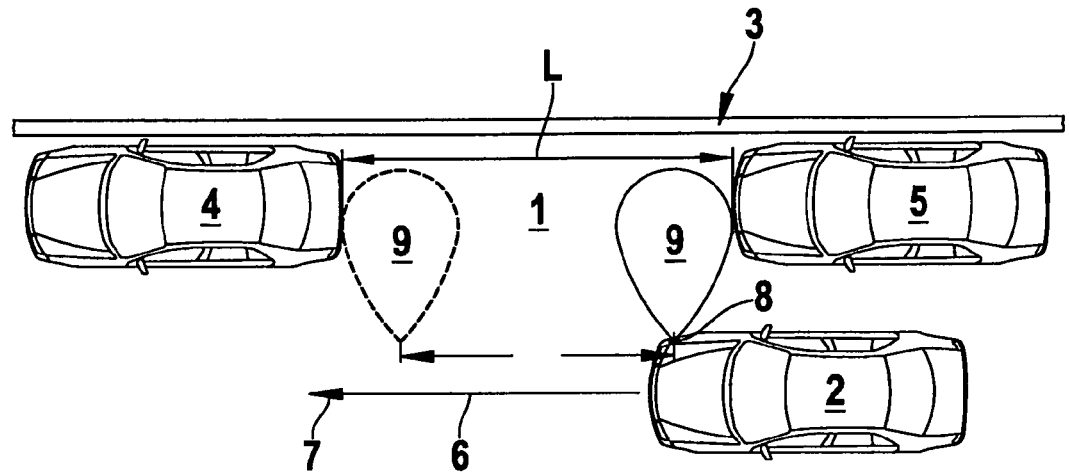
FIG. 1 shows a parking situation where a vehicle to be parked is driven past a parking space in parallel.

FIG. 1 shows a vehicle 2 designed as a passenger car to be parked into a lateral parking space 1 in a typical application of the exemplary embodiments and/or exemplary methods of the present invention. Parking space 1 is located on a lateral curb 3 between two vehicles 4, 5 already parked at curb 3. Vehicle 2 to be parked, which is driven past parking space 1 on a vehicle trajectory 6 in a forward direction symbolized by an arrow 7, has a sensor system of which a sensor 8, advantageously an ultrasonic sensor, situated for example in the front on the right-hand side of the vehicle, is shown by a lobe-shaped sensor field 9.

As is apparent, length L of the parking space essentially corresponds to the distance traveled by vehicle 2, the difference caused by the lobe shape of sensor field 9 being taken into account in the calculational ascertainment of length L in a manner known per se.

Figure 2:
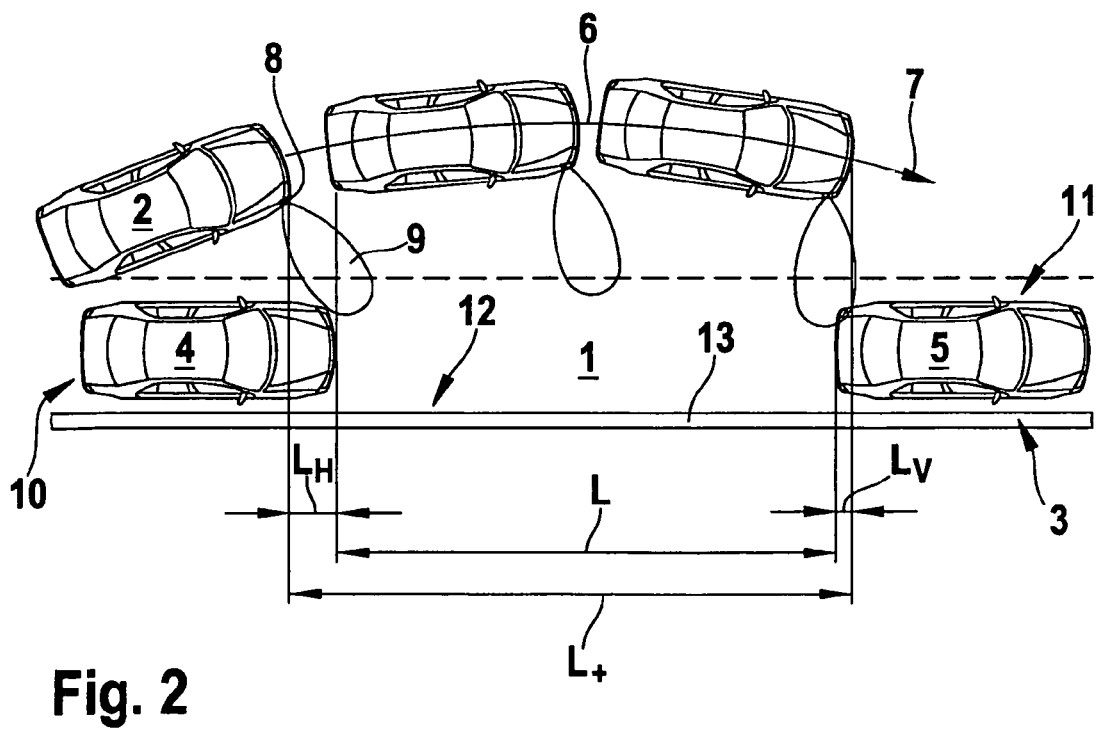
FIG. 2 shows a parking situation of the vehicle to be parked on a curved trajectory.

In contrast, FIG. 2 shows a parking situation in passive cornering of vehicle 2 to be parked. Vehicle 2 to be parked is depicted as an example having sensor field 9 along trajectory 6 at three different points in time.

It is apparent that trajectory 6 of vehicle 2 to be parked is curved, here specifically convex, while curb 3 and parked vehicles 4, 5 have an approximately linear arrangement. This is known as passive cornering of vehicle 2 to be parked with respect to parking space 1.

In this exemplary embodiment, the steering angle of vehicle 2 to be parked is less than 0° while driving past parking space 1, and the orientation of delimiting objects 10, 11, 12 with respect to vehicle 2 to be parked exhibits a change, including a change of signs.

Parking space 1 is delimited by a first, rear delimiting object 10 which is formed by a first already parked vehicle 4, by a second, front delimiting object 11, which is formed by the second already parked vehicle 5, and by a third, lateral delimiting object 12, which is formed by a curb section 13 of roadway boundary 3. While vehicle 2 to be parked drives past parking space 1, the sensor system of vehicle 2 detects an erroneous length $L_+$ which is greater than actual length L of the parking space by the sum of a front longitudinal deviation $L_v$ and a rear longitudinal deviation $L_H$.

At the same time, the steering angle of vehicle 2 to be parked is measured while it drives past, and the radius of the curved trajectory is ascertained therefrom. This by itself is then used as a correction value for determining actual length L of the parking space on the basis of erroneously measured length $L_+$.

In contrast, driving the vehicle to be parked on a concave trajectory with respect to the parking space results in the reverse case that an erroneous length of the parking space is detected, which is smaller than the actual length of the parking space. Such a situation occurs relatively often in practice when the driver drives past a row of parked vehicles at a relatively great distance. If the driver sees a potentially adequate parking space ahead, after passing the parking space, the driver often intuitively reduces the distance to the parked vehicles to back up the vehicle more easily into it. This results, for example, in the case of a parking space on the right side, in the driver initially steering slightly to the right and then again compensating for this steering movement by a steering correction to the left in order not to collide with the parked vehicles. However, the length of the parking space cannot be directly measured when driving past it, only the length of the arc.

What is claimed is:

1. A method for providing assistance during a parking maneuver of a vehicle into a parking space situated laterally to the vehicle to be parked, the method comprising:
    detecting a length of the parking space with the aid of a sensor system of the vehicle while the vehicle drives past the parking space;
    detecting a trajectory of the vehicle differing from a straight trajectory of the vehicle while driving past the parking space; and
    ascertaining a correction value for the detected length of the parking space,
    wherein the trajectory of the vehicle is determined based on a rotation of the vehicle about its vertical axis, detected by a sensor, and the trajectory of the vehicle is determined based on a detected difference between the distances traveled by wheels on two tracks of the vehicle.

2. The method of claim 1, wherein the trajectory of the vehicle is determined based on at least one of a detected steering wheel angle and a steering angle.

3. The method of claim 1, wherein the trajectory of the vehicle is determined with the aid of a yaw rate sensor.

4. The method of claim 1, wherein the trajectory of the vehicle is determined with the aid of a transverse acceleration sensor.

5. The method of claim 1, wherein an actual length of the parking space is determined from the detected length of the parking space using the correction value.

6. The method of claim 1, wherein the correction value is detected one of continuously and at brief time intervals.

7. The method of claim 1, wherein the trajectory of the vehicle is determined with the aid of a yaw rate sensor, and wherein an actual length of the parking space is determined from the detected length of the parking space using the correction value.

8. The method of claim 1, wherein the trajectory of the vehicle is determined with the aid of a transverse acceleration sensor, and wherein an actual length of the parking space is determined from the detected length of the parking space using the correction value.

9. The method of claim 1, wherein the trajectory of the vehicle is determined with the aid of a yaw rate sensor, wherein an actual length of the parking space is determined from the detected length of the parking space using the correction value, and wherein the correction value is detected one of continuously and at brief time intervals.

10. The method of claim 1, wherein the trajectory of the vehicle is determined with the aid of a transverse acceleration sensor, wherein an actual length of the parking space is determined from the detected length of the parking space using the correction value, and wherein the correction value is detected one of continuously and at brief time intervals.

* * * * *